No. 890,144. PATENTED JUNE 9, 1908.
H. W. LEONARD.
AUTOMATICALLY CONTROLLING ELECTRIC MOTORS.
APPLICATION FILED JAN. 5, 1903.
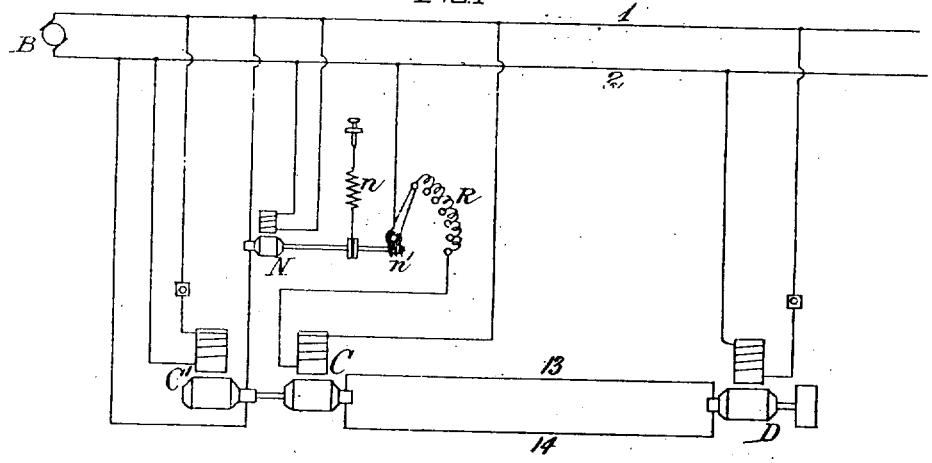
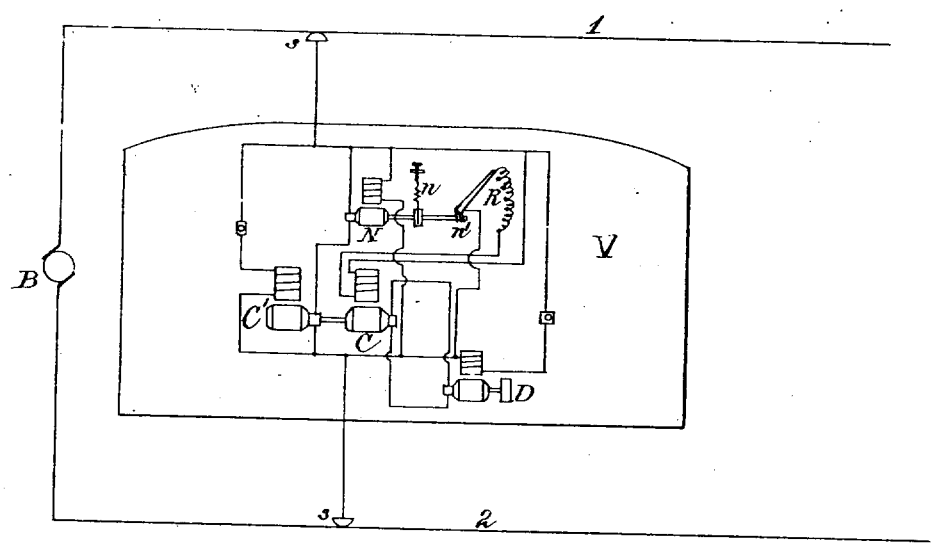
Witnesses
Geo. N. Kerr.
Geo. O. Hoffman
H. Ward Leonard Inventor
By his Attorney C. A. Edwards

UNITED STATES PATENT OFFICE.

HARRY WARD LEONARD, OF BRONXVILLE, NEW YORK.

AUTOMATICALLY CONTROLLING ELECTRIC MOTORS.

No. 890,144.     Specification of Letters Patent.     Patented June 9, 1908.

Original applications filed February 6, 1897, Serial No. 622,269, and January 28, 1902, Serial No. 91,577. Divided and this application filed January 5, 1903. Serial No. 137,804.

*To all whom it may concern:*

Be it known that I, HARRY WARD LEONARD, a citizen of the United States, residing at Bronxville, in the county of Westchester and State of New York, have invented a certain new and useful Improvement in Automatically Controlling Electric Motors, of which the following is a specification.

My invention relates to the control of electric motors and especially to the automatic control of electric motors in such a way that the motor will automatically operate to do just the amount of work required of it when the amount of work to be done is variable, as in the case of pumping water, compressing air, propelling cars, etc.

In the operation of certain machinery, it is desirable that means be provided which will automatically protect the same from being exposed to excessive strains. This can be readily accomplished by the use of my invention.

My invention is also applicable to the operation from a source of power having a tolerably constant amount of energy at a tolerably constant speed, of machinery the torque element of the power of which may vary very widely, such as hoists, pumps, locomotives, etc.

In carrying my invention into effect, I employ a rheostat connected in the field circuit of a dynamo electric machine which supplies a part or all of the energy for the working motor to be controlled; that is to say, instead of regulating the working motor directly, I regulate its source of energy. This rheostat I cause to be operated automatically preferably by a small dynamo electric machine whose armature is connected in series with the driving motor for the dynamo electric machine which supplies the energy to the working motor so that as the load on this motor varies and hence the amount of energy taken from the main source is varied, the armature of the small dynamo electric machine is caused to rotate an adjustable load or other device and by means of a suitable driving connection the rotation of this armature adjusts the position of the rheostat lever to control the field strength of the dynamo electric machine which supplies the energy to the working motor. Thus it will be seen by this arrangement I automatically cause to be varied the net effective volts delivered to the working motor to such a voltage as will operate the motor at the speed required.

My invention is illustrated in the accompanying drawings in which

Figure 1 is a diagram illustrating an arrangement in which the armature of the working motor is connected in a local circuit in series with the armature of a dynamo electric machine, the field strength of which is controlled by the automatic device which responds to variations in the amount of energy taken from the main line by the machine which drives this generator; and Fig. 2 is a diagram showing an application of my invention to the operation of a moving vehicle.

Referring to the drawing, B represents a main source of electric energy and 1—2 the circuit extending therefrom.

C is a dynamo electric machine driven by motor C' and D is the working motor connected in the local circuit 13—14 extending from the armature terminals of machine C. The field windings of C' and D are connected directly across the main line 1—2 and the field winding of machine C is also connected across the main line but in series with a rheostat R. The contact lever of this rheostat is operated by means of the worm gear n' or other suitable means driven by a shaft extending from the armature of a small dynamo electric machine N. On this shaft is a hub to which is connected an adjustable spring or equivalent adjustable loading device n. The armature of machine N is connected in series with the armature of machine C' across the main line 1—2 and the field of machine N is wound to be connected directly across the main line. The armature of machine N is of low voltage and the current for machine C' passing through that armature produces a torque in the armature of machine N which is balanced by the adjustable device n. Thus it will be seen that if the current to machine C' becomes too large, due to a decrease of speed an counter-electro-motive force of C' with reference to the electro-motive force of the supply circuit, the torque of machine N causes its shaft to revolve and through the worm gear $n'$ adjust the rheostat R to cause a drop in the voltage of machine C and hence a reduction of the electro-motive force at the terminals of the working motor D. When the current to machine C' falls, the spring or equivalent device connected with the armature shaft of machine N causes that shaft to rotate in the opposite direction thereby re-adjusting the rheostat R to cause an increase in the voltage of machine C and hence an increase of the electro-motive force at the armature terminals of the working motor. Thus it will be noted that the action of motor N is dependent upon the relative values of the two electro-motive forces in its circuit, which are the practically constant electro-motive force of the supply circuit and the relatively variable opposing or counter electro-motive force of the motor C'.

The dynamo electric generator C which supplies energy to the armature of motor D will supply a current dependent upon the torque required of D which torque will in many practical instances vary over a wide range. When the torque required of D varies, the current generated by C will correspondingly vary and this will cause a variation momentarily in the current flowing through N, on account of the increased work momentarily performed by C', which consequently will automatically move R to such a point that the volts generated by C will be such as to make the watts supplied to the armature D practically constant. It will be noted that the watts of C and C' are practically equal at all times, and since the power of C' is practically constant, being supplied with a constant current at a constant electro-motive force, the watts of C are also practically constant and the watts supplied to the armature of D are also automatically maintained practically constant, even under conditions of wide variations of the torque of the work performed by D. This arrangement is very useful with a working motor whose torque varies and where it is desirable to always take approximately the same amount of energy. With this arrangement applied to a vehicle, for instance, the vehicle would travel fast on a level and slow on grades while using the same amount of energy.

Fig. 2 illustrates one application of my invention. The source B is shown connected to the supply and return conductors 1, 2 and the car or moving vehicle is indicated at V. Sliding contacts $s$ are shown engaging the conductors 1, 2 and the apparatus on the vehicle is similar and corresponds to that shown and described with reference to Fig. 1, D representing a propelling motor.

This application is a division from my application for Patent No. 717,584, granted January 6, 1903, and from my pending application Serial No. 91,577, filed January 28, 1902.

While I have only shown one specific form of my invention, the same is susceptible of many embodiments, and I do not wish or intend to be limited otherwise than as expressed in the following claims.

What I claim is:—

1. The combination with a main source of electric energy, a motor to be controlled, a dynamo electric machine supplying energy to said motor, a second motor operated by energy from the main source for driving said dynamo, and means controlled by the amount of energy taken by said second motor from the main source for changing the resistance in one element of said dynamo electric machine.

2. The combination with a main source of electric energy, a motor to be controlled, a dynamo electric machine supplying energy to said motor, a second motor operated by energy from the main source for driving said dynamo, and means controlled by the amount of energy taken by said second motor from the main source for controlling the field excitation of said dynamo to vary the energy supplied to the motor to be controlled.

3. The combination with a main source of electric energy, a motor to be controlled, a dynamo electric machine supplying energy to said motor, a second motor operated by energy from the main source for driving said dynamo, and an electro-responsive device controlled by the amount of energy taken by said second motor from the main source for controlling the energy delivered to the motor to be controlled.

4. The combination with a main source of electric energy, a motor to be controlled, a dynamo electric machine supplying energy to said motor, a second motor operated by energy from the main source for driving said dynamo, and an electro-responsive device controlled by the amount of energy taken by said second motor from the main source for controlling the field excitation of said dynamo to vary the energy supplied to the motor to be controlled.

5. The combination with a main source of electric energy, a motor to be controlled, a dynamo electric machine supplying energy to said motor, a second motor operated by energy from the main source for driving said dynamo, a rheostat for regulating the field of said dynamo, and an electro-responsive device for operating said rheostat, said device being connected in series with the armature of the second motor.

6. The combination with a main source of electric energy, a motor to be controlled, a dynamo electric machine supplying energy to said motor, a second motor operated by energy from the main source for driving said dynamo, a rheostat for regulating the field of said dynamo, and a motor for operating said rheostat and whose torque varies with the variations in the amount of energy taken by the second motor from the main source.

7. The combination with a main source of electric energy, a motor to be controlled, a dynamo electric machine supplying energy to said motor, a second motor operated by energy from the main source for driving said dynamo, a rheostat for regulating the field of said dynamo, and a motor for operating said rheostat, the armature of said motor being connected in series with the armature of the second motor.

8. The combination with a main source of electric energy, a motor to be controlled, a dynamo electric machine supplying energy to said motor, a second motor operated by energy from the main source for driving said dynamo, a rheostat for regulating the field of said dynamo, a motor for operating said rheostat, and an adjustable load on the armature shaft of said motor, the torque of which is varied in proportion to the energy taken from the main source by said second motor.

9. The combination with a main source of electric energy, a motor to be controlled, a dynamo electric machine supplying energy to said motor, a second motor operated by energy from the main source for driving said dynamo, a rheostat for regulating the field of said dynamo, a motor for operating said rheostat and having its armature connected in series with the armature of the second motor, and an adjustable load on the armature shaft of the rheostat motor.

10. The combination of a generator normally producing an electro-motive force and supplying energy to a translating device requiring a current variable over a wide range to suit conditions of practice, and means dependent upon the current supplied to the translating device for automatically varying the volts supplied to the translating device by the generator, so that the watts supplied to the translating device will be practically constant.

11. The combination of a dynamo electric generator supplying energy to an electromotor, the torque of which under conditions of practice varies over a wide range, and means controlled by variations in the torque of the motor for automatically varying the electro-motive force of the watts of the motor, so as to maintain said watts of the motor practically constant.

12. The combination with a main source of electric energy, a motor to be controlled, a dynamo electric machine supplying energy to said motor, a second motor operated by energy from the main source for driving said dynamo, and means controlled by the amount of energy taken by said second motor from the main source for delivering to the motor substantially the same amount of energy as that taken from the line at the current required to operate the motor.

13. The combination of a generator normally producing an electromotive force and supplying energy to a translating device requiring a current variable over a wide range to suit conditions of practice, and means external to said generator dependent upon the current supplied to the translating device for automatically varying the volts supplied to the translating device by the generator, so that the watts supplied to the translating device will remain within predetermined limits.

14. The combination of a dynamo electric machine, an electric motor supplied with energy therefrom, the torque of said motor varying over a wide range under conditions of practice, and means external to said machine dependent upon the torque of the motor required in practice for automatically varying the electromotive force of the watts of the motor so as to keep the watts of the motor within predetermined limits.

15. In a system of electric power transmission, an electric generator and a suitable motor for operating same, an electric motor whose armature is supplied with current from the armature of said generator, and means exterior of the generator acting automatically for controlling the electromotive force of the generator armature as an increased or decreased torque output is demanded by the motor, thereby causing a decrease or increase respectively of the electromotive force and a corresponding increase or decrease respectively of current supplied to the motor armature.

16. In an electrically propelled vehicle, the combination with the electric propelling motor, of a source of electric energy means on the vehicle external to said source dependent upon the torque required of the propelling motor for automatically controlling the energy delivered to the propelling motor.

17. The combination with a dynamo electric machine, a circuit supplied thereby, a rheostat arranged to vary the field excitation of the dynamo electric machine, an electric motor for actuating the rheostat, a circuit in which said motor is connected, and two devices producing relatively variable electromotive forces in said motor circuit.

18. The combination of a dynamo electric machine, a circuit supplied thereby, an electric motive device for varying the field excitation of the machine, a circuit in which said motive device is connected, and two devices producing relatively variable electromotive forces in the circuit of said motive device.

19. The combination of a dynamo electric machine, a device for causing a variation in the field excitation of the machine, an electric motive device operatively connected thereto, a circuit in which said motive device is connected, and two devices producing normally opposing electromotive forces in the circuit of said motive device.

20. The combination of an electromotive force producing device, and a device producing an opposing electromotive force in circuit therewith, a translating device, and means responsive to a difference between the electromotive forces produced by said devices for controlling the amount of energy delivered to said translating device.

21. A source of constant electromotive force, a circuit leading therefrom containing a counter electromotive force producing device, and means responsive to the difference between the electromotive force of the source and the counter electromotive force for controlling the energy delivered.

22. Two electromotive force producing devices, the electromotive forces of which normally have a nearly fixed relation to each other, and means responsive to a change in said relative value for controlling one of the said electromotive forces so as to restore said relation.

23. A circuit containing two opposing electromotive force producing devices, and means responsive to the change in the difference between the said electromotive forces for automatically correcting changes from said difference.

24. A circuit containing two opposing electromotive force producing devices, and means in said circuit responsive to a change in the difference between the said electromotive forces for automatically correcting changes from said difference.

25. A circuit containing an electromotive force producing device having a constant electromotive force, and also containing a device having a counter electromotive force which is normally substantially equal to the constant electromotive force and which is subject to variation in practice, and means included in said circuit responsive to said change in electromotive force for automatically correcting said change.

26. A source of electromotive force, a circuit leading therefrom, a second circuit, the energy in which is derived from the first circuit, and means responsive to a change of energy occurring in said derived circuit for restoring the watts of energy in the derived circuit to its normal value.

27. An electrically propelled vehicle, a propelling motor therefor, a circuit including at least one element of said propelling motor, and automatically movable means on the vehicle dependent upon the torque required of the propelling motor which automatically governs the watts supplied for the propulsion of the vehicle.

28. A constant electromotive force source of supply, an electrically propelled vehicle supplied with energy therefrom, a propelling motor, and automatically movable means upon the vehicle dependent upon the torque required of the propelling motor for automatically controlling the watts used to propel the vehicle.

29. A constant electromotive force source of supply; an electrically propelled vehicle supplied with energy therefrom, a propelling motor, a transformer of electric energy carried by the vehicle, one element of the propelling motor being supplied with such transformed energy, and means carried by the vehicle responsive to one element of the watts of the transformed energy for automatically controlling the other element of the watts of said transformed energy.

30. A translating device, a device producing an electromotive force by magnetic induction which supplies energy to said translating device, a circuit and devices connected therein which produce an impressed and a counter electromotive force, the values of which electromotive forces are normally fixed relatively to each other, an electro responsive device in said circuit which responds to a change in the relative values of the said two electromotive forces and which thereby affects the electromotive force supplied to said translating device.

31. The combination of a generator normally producing an electromotive force and supplying energy to a translating device requiring a current variable over a wide range to suit conditions of practice, and means external to said generator dependent upon the current supplied to the translating device for automatically varying the volts supplied to the translating device by the generator, so that as the amperes increase the volts will be diminished.

32. The combination of a dynamo electric generator supplying energy to an electric motor, the torque of which under conditions of practice varies over a large range, and means external to said generator controlled by variations in the torque of the motor for automatically inversely varying the electromotive force of the watts of the motor, whereby the electrical energy will be transformed into useful work without material loss of energy.

33. The combination of an electric motor, the torque of which under conditions of practice varies over a wide range, a dynamo electric machine having a field winding energized by a current other than its armature current, means dependent upon the current supplied for automatically controlling the current in said field winding and thereby inversely varying the volts and amperes supplied to the motor armature.

34. In an electrically propelled vehicle, the combination with the electric propelling motor, of means on the vehicle dependent upon the torque required of the propelling motor for automatically controlling the energy delivered to the propelling motor, said means comprising an electro-magnetic winding energized independently of the source supplying the armature of the propelling motor.

35. In an electrically propelled vehicle, the combination with the electric propelling motor, of means on the vehicle dependent upon the torque required of the propelling motor for automatically controlling the energy delivered to the propelling motor, said means comprising a dynamo electric machine having a field winding excited independently of its armature current or voltage.

36. In an electrically propelled vehicle, the combination with the electric propelling motor, of means on the vehicle dependent upon the torque required of the propelling motor for automatically controlling the energy delivered to the propelling motor, said means comprising mechanism automatically moved in response to a change of torque of the motor.

37. In an electrically propelled vehicle, the combination with the electric propelling motor, of means on the vehicle dependent upon the torque required of the propelling motor for automatically controlling the energy delivered to the propelling motor, said means comprising a dynamo electric machine having an automatically controlled rheostat for varying its field strength.

38. In an electrically propelled vehicle, the combination with the electric propelling motor, of means on the vehicle dependent upon the torque required of the propelling motor for automatically controlling the energy delivered to the propelling motor, said means comprising a dynamo electric machine and a movable element for controlling the strength of its magnetic field.

39. The combination of a source of electrical energy, one component of which is substantially constant and the other of which is variable, a translating device, and electro-responsive means responsive to a change in said variable energy component for maintaining a practically constant supply of energy to said translating device.

40. The combination of a source of electrical energy, both components of which are variable over a wide range, a motor whose armature is supplied from said source, and means exterior to the motor and said source responsive to a change in one component of the energy supplied for inversely varying the other component of the energy.

41. The combination of a source of electrical energy, both components of which are variable over a wide range, a motor whose armature is supplied from said source, and means additional to the windings of said motor and said source responsive to a change in one component of the energy supplied to the armature for inversely varying the other component of the energy.

42. The combination of a dynamo electric generator, and electrically controlled mechanism for varying inversely over a wide range the volts and amperes of said generator, said mechanism being automatically responsive to a change in one component of the energy delivered by said generator.

43. A source of electromotive force, an electrically propelled vehicle supplied with energy therefrom, a propelling motor, a transformer of electric energy carried by the vehicle, at least one element of the propelling motor being supplied with such transformed energy, and means moving with the vehicle responsive to one element of the watts of the transformed energy for automatically controlling the other element of the watts of said transformed energy.

44. In a vehicle, the combination with a motor, of a dynamo, and means external to said dynamo for automatically controlling the energy of the dynamo according to the demand of the motor, substantially as described.

45. In a vehicle, the combination with a motor, a dynamo and means for driving the dynamo, of means external to said dynamo for automatically controlling the energy generated according to the demand of the motor, substantially as described.

46. In a vehicle, the combination with a motor, a dynamo and means for driving the dynamo, of electric means external to said dynamo for automatically controlling the energy supplied according to the demand of the motor, substantially as described.

47. The combination of a stationary source of electric energy, mains of substantially constant electromotive force extending therefrom, a vehicle, a propelling electric motor, means for receiving electric energy from said source and for transforming said energy by magnetic induction and delivering the transformed energy to at least one element of said motor, and means responsive to a change in the energy delivered to said element for automatically controlling the amount of energy from said source.

48. The combination of a stationary source of electric energy, mains of substantially constant electromotive force extending therefrom, a vehicle, a propelling motor therefor, moving contacts for leading energy upon said vehicle, electro-magnetic means on the vehicle for receiving the energy and delivering energy to at least one element of the propelling motor, said means comprising an electromagnetic winding connected in a local loop with said element of the propelling motor, and means on the vehicle for automatically controlling the energy taken from the source according to variation in the torque of the propelling motor.

49. The combination of a source of electric energy, a motor generator, the motor of which has at least one of its windings supplied with current from said source, and a device in the path of said current for automatically controlling the current taken from said source for maintaining said current within a predetermined limit.

50. The combination of a source of electric energy, a motor generator adapted to receive energy therefrom, a variable speed electric motor receiving energy from said motor generator, and means in the path of the current from said source to the motor of said motor generator for automatically controlling the energy from said source upon variation of current due to variations in torque of said variable speed motor.

51. The combination of a variable speed motor, the current in the armature of which is responsive to the change of the torque of the work, a variable voltage generator, the armature of said generator supplying current to the armature of said motor, an electric motor, the movable element of which drives the movable element of said generator, a supply circuit for supplying energy to said last named motor, and means between said supply circuit and the last named motor for automatically controlling the current taken from said supply circuit.

52. The combination of a supply circuit, means for transforming the electric energy taken from said supply circuit into electric energy of variable current and variable voltage, a variable speed and variable torque electric motor supplied with said transformed energy, and means for automatically maintaining the energy taken from said supply circuit constant within limits.

53. The combination of an electric motor, the movable element of which is adapted to produce a widely varying torque and a widely varying speed, a supply circuit, a motor generator for receiving energy from said supply circuit and supplying energy to said motor, and automatic means for causing said motor to produce the maximum torque and the maximum speed without exceeding a certain amount of energy from said supply circuit, said means comprising a device in circuit with the energy conducting means between said supply circuit and the motor portion of said motor generator.

54. The combination of a motor having a separately excited field winding, a generator having a separately excited field winding, the generator armature being connected in circuit with the motor armature, a motor for driving the armature of the generator, a supply circuit for supplying energy to said last named motor, and means between said supply circuit and said last named motor for automatically controlling the energy taken from said supply circuit.

55. The combination of a supply circuit of constant electromotive force, a motor having a winding supplied with energy therefrom, and means comprising a controlling winding in series with said motor winding for automatically limiting the amount of current which can be taken by said winding from said circuit.

56. The combination of a variable speed variable torque motor, a generator having a winding supplying energy to said motor, adjustable means for varying the voltage and current delivered by said generator winding, a motor for driving said generator, a source of supply for said driving motor, and automatic electroresponsive controlling means for automatically regulating the current from said source for keeping said current within certain limits.

57. In combination, an electric generator, a generator circuit, and a controlling device for said generator including electroresponsive means operative at a predetermined maximum load upon the generator irrespective of the value of current.

58. The combination of a constant electromotive force supply circuit, a motor operated by energy therefrom and having a field winding energized independently of its armature current, a rheostat for automatically controlling the operation of said motor, said rheostat being acted upon by a constantly acting force tending to move the same in one direction, and automatically responsive electromagnetic means for overpowering said force under certain conditions and for moving said rheostat in the opposite direction, said electromagnetic means being controlled by a current automatically responsive to the work done by the motor.

59. The combination of a shunt wound electric motor, an automatic device comprising movable contacts, said contacts being in series with the motor armature and carrying the motor armature current, and a rheostat automatically controlled by said device.

60. The combination of an electric motor, and means for automatically controlling the operation of the motor and automatically responsive to the work done by the motor, said means comprising a device in series with the armature current of said motor and an automatic rheostat controlled by said device.

61. The method of operating an electrically propelled vehicle which consists in generating electric energy at substantially constant electromotive force at a stationary source, transmitting electric energy by conductors to the vehicle, leading the energy upon the vehicle, transforming the energy, and employing part of the energy led to the vehicle for inversely varying the voltage of the transformed energy as the amperes are varied in accordance with the variation in torque of the propelling motor.

62. The method of operating an electric motor which consists in generating energy at a substantially constant electromotive force, transforming said energy into energy of variable electromotive force and current, and employing part of the energy generated at substantially constant electromotive force for controlling said transformed energy in accordance with the change in torque of the motor for maintaining a substantially constant consumption of energy within limits.

This specification signed and witnessed this 27 day of Dec. 1902.

H. WARD LEONARD.

Witnesses:
M. FITZGERALD,
S. McDONALD.